(12) United States Patent
Klevtsov

(10) Patent No.: US 6,244,509 B1
(45) Date of Patent: Jun. 12, 2001

(54) SCANNING DEVICE FOR CAPTURING IMAGES USING A LIGHT GUIDE

(75) Inventor: Valery Alekseevich Klevtsov, Demakova (RU)

(73) Assignee: Nauchno-Teknichesky Kooperative (Vector) (RU)

( * ) Notice: Subject to any disclaimer, the term of this patent is extended or adjusted under 35 U.S.C. 154(b) by 0 days.

(21) Appl. No.: 09/505,870

(22) Filed: Feb. 17, 2000

(30) Foreign Application Priority Data

Aug. 30, 1999 (RU) ................................................ 99118916

(51) Int. Cl.[7] .............................. G06K 7/10; G06K 7/14
(52) U.S. Cl. ...................... 235/454; 235/462.32; 235/473
(58) Field of Search ............................... 238/473, 462.35, 238/462.42, 462.32, 484, 455; 250/227.11; 359/599; 385/146

(56) References Cited

U.S. PATENT DOCUMENTS

| | | | | |
|---|---|---|---|---|
| 4,295,040 | * | 10/1981 | Berthier ................................. | 235/458 |
| 4,495,412 | * | 1/1985 | Thoone et al. ........................ | 250/227 |
| 5,266,788 | * | 11/1993 | Yamazaki et al. .................... | 235/467 |
| 5,291,009 | * | 3/1994 | Roustaei ................................ | 235/472 |
| 5,295,196 | | 3/1994 | Raterman et al. . | |
| 5,349,172 | | 9/1994 | Roustaei . | |
| 5,354,977 | | 10/1994 | Roustaei . | |
| 5,586,212 | * | 12/1996 | McConica et al. ................... | 385/146 |
| 5,646,390 | * | 7/1997 | Wang et al. .......................... | 235/454 |
| 5,696,865 | * | 12/1997 | Beeson et al. ....................... | 385/146 |
| 5,973,839 | * | 10/1999 | Dorsel .................................... | 359/599 |

FOREIGN PATENT DOCUMENTS

| | | | |
|---|---|---|---|
| 59-39165 | * | 3/1984 | (JP) . |
| 62-26971 | * | 2/1987 | (JP) . |
| 2032217 C1 | | 3/1995 | (RU) . |
| 92/16909 | * | 10/1992 | (WO) . |
| WO 94/19764 | | 9/1994 | (WO) . |
| WO 94/19766 | | 9/1994 | (WO) . |
| WO 99/18536 | | 4/1999 | (WO) . |

* cited by examiner

*Primary Examiner*—Karl D. Frech
*Assistant Examiner*—Jared J. Fureman
(74) *Attorney, Agent, or Firm*—Oliff & Berridge, PLC

(57) ABSTRACT

A scanning device for capturing images, which contains an optical unit comprising a light source, a light guide, and a light receiver. The light guide comprises a substantially parallel sided, transparent member, the member having first opposed ends extending between the parallel sides, one of the ends facing the light source and extending non-orthogonally between the parallel sides, the other end facing the image to be scanned in use, and second opposed ends extending between the parallel sides and the first opposed ends. Light from the light source enters the light guide through the one first end, is directed onto the image after passing out of the other first end, is reflected back into the light guide and then directed by the light guide towards the light receiver. The arrangement is such that one portion of the reflected light passes to the light receiver without being reflected by the second opposed ends while another portion of the reflected light passes to the light receiver after being reflected by one or both of the second opposed ends, the two portions being directed to different parts of the light receiver, the device further comprising a filter through which one of the light portions passes while the other does not.

10 Claims, 1 Drawing Sheet

SCANNING DEVICE FOR CAPTURING IMAGES USING A LIGHT GUIDE

FIELD OF THE INVENTION

The invention relates to scanning devices for capturing information, for example images from paper carriers, and is particularly, but not exclusively, concerned with scanning devices for capturing information on financial instruments such as banknotes of various types.

DESCRIPTION OF THE PRIOR ART

Various scanning devices for capturing information on paper image carriers are known. The most well known devices are hand-held scanners for reading bar codes, e.g. one patented under USSR Inventor's Certificate No. 1837334. That device contains a light source, a converging lens, an aperture diaphragm and diaphragm-coupled light receiver, all optically coaxial. A spherical lens is mounted between the scanned carrier and the aperture diaphragm. Such device may have the form of a ballpoint pen-like rod and be of a fairly simple design. The functionality of such a device, however, is limited to reading bar codes, its accuracy, resolution and operation speed being insufficient for other purposes. Other hand-held apparatuses—more sophisticated in design and having expanded functionalities—are also known (e.g. U.S. Pat. No. 5,349,172, U.S. Pat. No. 5,354,977, WO 94/19766 and WO 94/19764). Those devices use LED arrays to illuminate the carrier scanned and CCD arrays to take in reflected signals. Such devices, however, do not have sufficient functionality for scanning in large amounts of information when necessary.

Also known are desk-top scanning devices for capturing images and printed information. Such devices contain an optical unit comprising a light source, a light guide, a focusing and/or filtering optical element system, a light receiver and an A-D converter processing signals from the light receiver (e.g. Russian Federation Patent No. 2032217 and U.S. Pat. No. 5,295,196).

The deficiencies of known devices consist in their design complexity and the illuminator's excessive power consumption. The complexity of design is primarily the result of the sophisticated optical system which uses lenses, mirrors, etc. as focusing elements which are challenging in manufacture and require precise adjustment for correct operation of the device. Moreover, in order to obtain reflected luminous flux of sufficient intensity, a great amount of light energy is required to illuminate the information carrier.

WO99/18536 describes a much simpler scanning device which has been found to be very successful. However, we have realised that this device is not so far being utilized to its full ability.

SUMMARY OF THE INVENTION

In accordance with the present invention, a scanning device for capturing images, contains an optical unit comprising a light source, a light guide, and a light receiver, wherein the light guide comprises a substantially parallel sides, transparent member, the member having first opposed ends extending between the parallel sides, one of the ends facing the light source and extending non-orthogonally between the parallel sides, the other end facing the image to be scanned in use, and second opposed ends extending between the parallel sides and the first opposed ends; whereby light from the light source enters the light guide through the one first end, is directed onto the image after passing out of the other first end, is reflected back into the light guide and then directed by the light guide towards the light receiver, the arrangement being such that one portion of the reflected light passes to the light receiver without being reflected by the second opposed ends while another portion of the reflected light passes to the light receiver after being reflected by one or both of the second opposed ends, the two portions being directed to different parts of the light receiver, the device further comprising a filter through which one of the light portions passes while the other does not.

Up to now, the light guide and light source have been designed to minimise and substantially avoid reflections off the second opposed ends. In contrast, with this invention, we positively utilise those reflections to generate one or more further versions of the image to enable other characteristics of the image to be detected. This is particularly useful where substrates such as security documents are scanned since these will contain security feature such as features which fluoresce in the infra-red as well as features which are visible to the naked eye. With the invention, both types of feature can be detected substantially simultaneously by selectively filtering the light from each version of the image.

Typically, the second opposed ends will be substantially orthogonal to the parallel sides and may also be orthogonal to the first opposed ends. This simplifies the optical construction of the light guide.

The two portions of reflected light can be received by different parts of a single receiving device such as a linear CCD array or could be directed to different receiving devices which collectively form a "light receiver".

In one example, one of the reflected portions of light is passed unfiltered to the light receiver while the other is selectively filtered prior to being received. In other examples, both portions could be filtered.

The light source will typically generate radiation in visible and invisible wavelength band, the invisible band being infrared or ultraviolet. However, other combinations are possible such as three or more wavelength bands (either all visible, all invisible or a mixture) or two visible wavelength bands, for example infrared and ultraviolet. The pass band(s) of the or each filter will be chosen accordingly.

The invention thus provides a scanning device, which is simple in design, provides high performance and high speed of operation at a low power of illumination to capture images on transported carriers, for example paper or plastics, and in particular security documents such as credit cards, identification cards and banknotes carried on a transport system, such as a banknote processing machine.

The use of a light guide of this form concentrates light from the light source on to the image carrier, thus enabling relatively weak sources to be used while at the same time providing a simple way of separating the transmitted and received light (and corresponding transmitting and receiving apparatuses) in a compact manner.

BRIEF DESCRIPTION OF THE DRAWINGS

An example of a scanning device according to this invention will now be described with reference to the accompanying drawing, in which.

DETAILED DESCRIPTION OF THE EMBODIMENT

Figure 1:
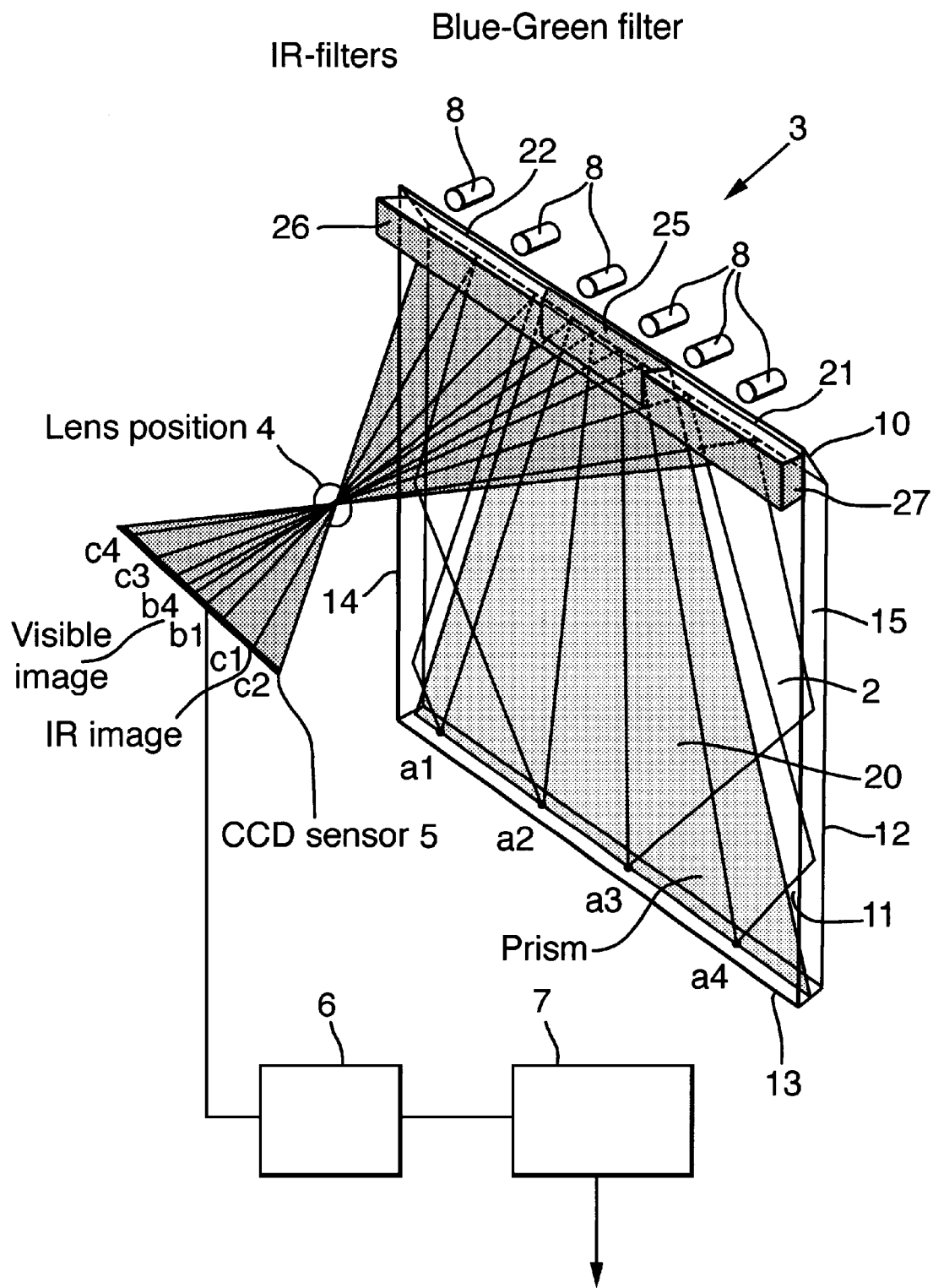
FIG. 1 is a diagram of the scanning device for capturing images, partly in block diagram form.

The scanning device comprises a light source 3, a light guide 2, a lens 4, and a CCD or other photosensitive linear array 5 which serves as an image receiver in this particular sample, a CCD array control unit 6 and an A-D converter 7 of signals arriving from CCD linear array 5. Typically, the image may be information or patterns including all overt and covert elements of financial instruments such as banknotes, cheques, travellers cheques and postal orders.

The light source 3 in this example comprises six tungsten filament bulbs 8, preferably halogen-filled, 15W each. Of course, any other type of light source could be used as well as different numbers from six. The light may be visible or non-visible, for example infra-red, or a combination. The bulbs are arranged in a row and are located in front of and practically in contact with an upper canted end 10 of the light guide 2. Light guide 2 is a transparent plane-parallel plate, made of glass in this example, one of the end sides whereof—the upper end 10 in this example—is canted at 45° to the parallel sides 11,12. The cant angle may vary depending on a number of factors as described in more detail in WO-A-99/18536 incorporated herein by reference. As far as the detection system is concerned, the angle of the prism determines where the lens 4 and sensor 5 are to be placed, the refractive index of the glass having a small part to play in this as well. The can angle and refractive index of the glass determine the characteristics of the illumination system (intensity, uniformity, etc.). The cant angle will be chosen to optimise performance in light concentration and separation but conveniently the angle is in the range 27°–49°, preferably 41°–49°.

An end 13 opposite to the canted end 10 of the light guide 2 faces the image carrier (not shown) and extends orthogonally to the parallel sides although other non-orthogonal angles could be used.

The ends 10,13 of the light guide 2 constitute "first opposed ends" and, as can be seen in the drawings, the light guide has a pair of second opposed ends 14,15 substantially orthogonal to the parallel sides 11,12 and to the first opposed ends 10,13.

In use, a carrier of an image is located beneath the end 13 of the light guide 2 and for example this may be a static arrangement or in the preferred example, the carrier is transported beneath the end 13. Light from the bulbs 8 in the visible and infrared wavelength bands enters the light guide 2 through the canted end 10 and passes downwardly through the light guide and out through the end 13 following which it impinges on the image. Light is then reflected back through the end 13 and from each point on the image, some light will pass directly up through the light guide 2 without reflection from the ends 14,15 as shown by the shaded area 20 where it impinges on the inner surface of the end 10 and is reflected towards the lens 4. This portion of the reflected light then is focused onto a central portion of the CCD array 5. Example rays of reflected light from the points a1–a4 are shown impinging on points b1–b4 of the array.

In addition, other portions of the reflected light are reflected off the ends 14,15 of the light guide onto laterally outer sections 21,22 of the end 10 and are then reflected via the lends 4 onto laterally outer sections of the CCD array 5. Thus, some light from the points a1, a2 is reflected off the end 14 to the section 22 of the end 10 and is then focused by the lens 4 onto points c1,c2 of the array 5. Similarly, some light from the points a3,a4 is reflected off the end 15 onto points c3,c4 of the array 5.

It can be seen therefore that two copies of the scanned image are received by the array 5. We take advantage of this by positioning different light filters in the paths of the different portions of reflected light. In this example, a blue-green filter 25 is mounted to the light guide 2 so as to intercept the path of the light portion 20 while infra-red filters 26,27 are mounted to the light guide substantially coincident with the sections 21,22 of the end 10.

The infra-red filters 26,27 allow infra-red rays to pass while blocking other wavelengths while the blue-green filter 25 allows the passage of certain visible radiation but inhibits the passage of other wavelengths.

The CCD array controller 6 can then be used to obtain colour information from the different parts of the array 5 which, after A/D conversion in the converter 7 is stored or otherwise processed in a conventional manner.

The ability to make use of radiation reflected from the ends 14,15 is achieved primarily by increasing the size of the array 5 over that used in the system described in WO-A-99/18536.

A typical light guide 2 has a width of about 100 mm, a height of about 87 mm, and a thickness of about 4 mm.

The lens 4 may be a yamano lens, with a focal distance of 3.5 mm and operational field of 0.5 inches. Due to the "barrel" like distortion at the lens operational field edges, the IR image will be of a slightly smaller size along the axis of scanning, typically 6–7% smaller than the visible image.

Although a single array 5 is shown, multiple arrays could be used instead.

I claim:

1. A scanning device for capturing images, which contains an optical unit comprising a light source, a light guide, and a light receiver, wherein the light guide comprises a substantially parallel sides, transparent member, the member having first opposed ends extending between the parallel sides, one of the ends facing the light source and extending non-orthogonally between the parallel sides, the other end facing the image to be scanned in use, and second opposed ends extending between the parallel sides and the first opposed ends; whereby light from the light source enters the light guide through the one first end, is directed onto the image after passing out of the other first end, is reflected back into the light guide and then directed by the light guide towards the light receiver, the arrangement being such that one portion of the reelected light passes to the light receiver without being reflected by the second opposed ends while another portion of the reflected light passes to the light receiver after being reflected by one or both of the second opposed ends, the two portions being directed to different parts of the light receiver, the device further comprising a filter through which one of the light portions passes while the other does not.

2. A device according to claim 1, wherein the second opposed ends are substantially orthogonal to the parallel sides.

3. A device according to claim 1, wherein the second opposed ends are substantially orthogonal to the first opposed ends.

4. A device according to claim 1, wherein the light receiver is formed by a single receiving device.

5. A device according to claim 4, wherein the light receiver is a linear CCD array.

6. A device according to claim 1, the device including two different filters, one for each portion of reflected light.

7. A device according to claim 6, wherein the filters comprise an infrared filter and a blue-green filter.

8. A device according to claim 1, wherein the filter is mounted to the light guide.

9. A device according to claim 1, wherein the light source generates radiation in visible and invisible wavelength bands.

10. A device according to claim 9, wherein the invisible wavelength band is in the infrared range.

* * * * *